(12) United States Patent
Moore

(10) Patent No.: US 7,697,421 B2
(45) Date of Patent: Apr. 13, 2010

(54) METHOD AND APPARATUS FOR QUALITY-OF-SERVICE-BASED ADMISSION CONTROL

(75) Inventor: Sean S. B. Moore, Hollis, NH (US)

(73) Assignee: Avaya Inc., Basking Ridge, NJ (US)

(*) Notice: Subject to any disclaimer, the term of this patent is extended or adjusted under 35 U.S.C. 154(b) by 909 days.

(21) Appl. No.: 11/111,464

(22) Filed: Apr. 21, 2005

(65) Prior Publication Data

US 2006/0239184 A1 Oct. 26, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/229; 370/252; 370/352
(58) Field of Classification Search ................. 370/356, 370/493, 261, 466, 395, 468, 469, 471, 230, 370/229, 252, 328, 332, 33, 340; 455/423, 455/560, 422

See application file for complete search history.

(56) References Cited

U.S. PATENT DOCUMENTS

| | | | | |
|---|---|---|---|---|
| 5,400,226 | A * | 3/1995 | Hogrefe | 362/517 |
| 6,385,173 | B1 * | 5/2002 | Lindskog et al. | 370/252 |
| 6,556,565 | B1 * | 4/2003 | Ward et al. | 370/356 |
| 7,298,736 | B1 | 11/2007 | Matthews | |
| 2002/0068576 | A1 | 6/2002 | Ritzen et al. | |
| 2002/0181394 | A1 * | 12/2002 | Partain et al. | 370/229 |
| 2003/0206537 | A1 | 11/2003 | Choi et al. | |
| 2004/0106405 | A1 | 6/2004 | Gabriel et al. | |
| 2005/0052992 | A1 * | 3/2005 | Cloonan et al. | 370/229 |
| 2005/0083912 | A1 * | 4/2005 | Afshar et al. | 370/352 |
| 2006/0209873 | A1 * | 9/2006 | Knabchen et al. | 370/443 |

FOREIGN PATENT DOCUMENTS

WO 02067619 A2 8/2002

OTHER PUBLICATIONS

Shu Tao et al. "Improving VoIP Quality Through Path Switching", INFOCOM 2005. 24th Annual Joint Conference of the IEEE Computer and Communications Societies, Miami, FL, pp. 2268-2278, Mar. 17, 2005.
Casetti et al., "An Adaptive Algorithm for Measurement-based Admission Control in Integrated Services Packet Networks", "Computer Communications", Aug. 30, 2000, pp. 1363-1376, vol. 23, No. 14-15, Publisher: Elsevier BV.
Jiang et al., "Measurement-Based Admission Control: A Revisit", "http://www.q2s.ntnu.no/publications/open/2004/Paper_non_rev/2004_jiang_MBA.pdf", 2004, Publisher: Norwegian University of Science and Technology NTNU, Published in: NO.
Szabo, Istvan, "Performance Evaluation of a New End-to-End Measurement Based Call Admission Control Scheme for Supporting IP Telephony", "Proceedings of the Symposium of Performance Evaluation of Computer and Telecommunication Systems", Jul. 15-19, 2001, pp. 498-505.

* cited by examiner

*Primary Examiner*—Ricky Ngo
*Assistant Examiner*—David Oveissi
(74) *Attorney, Agent, or Firm*—Joseph B. Ryan; Jason Paul DeMont; Wayne S. Breyer

(57) ABSTRACT

Methods and apparatus are provided for QoS-based admission control (QBAC). The disclosed QoS-based admission control techniques use QoS parameter measurements. An admission control request for a call on a path in a packet network is processed by obtaining performance data for the path; and predicting a performance of the call on the path using performance data for the path. In one implementation, the predicted performance is based on one or more derivatives of the performance data. Typically, the performance data includes historical performance data and is based on at least one quality of service metric.

16 Claims, 1 Drawing Sheet

METHOD AND APPARATUS FOR QUALITY-OF-SERVICE-BASED ADMISSION CONTROL

CROSS-REFERENCE TO RELATED APPLICATIONS

The present application is related to U.S. patent application Ser. No. 11/111,465, entitled "Method and Apparatus for Adaptive Control of System Parameters for Admission Control," filed contemporaneously herewith and incorporated by reference herein.

FIELD OF THE INVENTION

The present invention relates generally to communication methods and systems, and more particularly, to methods and systems for admission control in a packet-switched network.

BACKGROUND OF THE INVENTION

Generally, the Internet Protocol (IP) protocol and IP networks have been designed to support a single, best-effort class of service. IP networks have successfully transported TCP-mediated data traffic. As a result, there is a convergence effort to migrate all networked applications, such as voice and videoconferencing applications, to use IP networks as the common transport medium. Best-effort service, however, is not sufficient to meet the Quality-of-Service (QoS) needs of these next-generation applications, especially in an enterprise environment.

A challenging problem for IP networks is efficient admission control (AC). Admission control is required, for example, to support QoS for many inelastic applications. A number of techniques have been proposed or suggested for admission control in packet-switched networks. For example, resource-based admission control (RBAC) methods reserve sufficient network resources for an application on a per-flow basis to handle specified peak bandwidth needs. While generally providing guaranteed QoS, RBAC techniques ignore statistical multiplexing and are therefore inefficient in the sense that additional flows could typically be admitted without experiencing QoS degradation.

More recently, measurement-based admission control (MBAC) methods have been proposed that learn the statistics of network traffic by making on-line measurements. In addition to improving the number of calls supported within a given bandwidth, when compared to RBAC methods, MBAC methods require simpler traffic specifications and are simpler to analyze and design. MBAC methods may be categorized as passive, active, or hybrid techniques. Passive MBAC techniques measure statistics of actual bearer (non-synthetic) traffic. Active MBAC techniques probe the network with synthetic traffic. Hybrid methods combine passive and active methods to improve accuracy and reduce active traffic loads.

While existing MBAC techniques exhibit improved efficiency, by admitting a greater number of calls before unnecessary blocking is experienced, they suffer from a number of limitations, which if overcome, could further improve the utility and efficiency of admission control techniques in packet networks, such as IP networks. For example, such MBAC techniques are based on bandwidth measurements. In addition, they often require unavailable or expensive router functionality and do not address end-to-end considerations, focusing on enforcing admission control on a single link instead of on paths between endpoints.

A need therefore exists for methods and apparatus for admission control that determine whether sufficient bandwidth exists, in a statistical sense, across a path to admit the next flow without exceeding a statistically computed bandwidth limit. A further need exists for methods and apparatus for admission control that can map bandwidth loads to QoS values. Existing methods for mapping bandwidth measures to QoS, as described, for example, in L. Yao, "Queuing Analysis and Control of Long Range Dependent Traffic: Applications to Internet Traffic Engineering," Ph.D. Dissertation, George Washington University, apply only to highly aggregated traffic over high-speed links, and are therefore not appropriate for typical admission control scenarios or customer environments.

SUMMARY OF THE INVENTION

Generally, methods and apparatus are provided for QoS-based admission control (QBAC) for a packet network, such as an IP network. The disclosed QoS-based admission control techniques use QoS parameter measurements. According to one aspect of the invention, an admission control request for a call on a path in a packet network is processed by obtaining performance data for the path; and predicting a performance of the call on the path using performance data for the path. In one implementation, the predicted performance is based on one or more derivatives of the performance data. Typically, the performance data includes historical performance data and is based on at least one quality of service metric.

A more complete understanding of the present invention, as well as further features and advantages of the present invention, will be obtained by reference to the following detailed description and drawings.

DETAILED DESCRIPTION

The present invention provides an MBAC technique referred to as QoS-based admission control (QBAC). According to one aspect of the invention, admission control techniques are provided that use QoS parameter measurements directly rather than inferring them from bandwidth measurements and statistics. According to another aspect of the invention, the disclosed admission control techniques are infrastructure-independent and make few assumptions about the network configuration, e.g., voice-data traffic mixes and Class-of-Service (CoS) and QoS settings.

Figure 1:
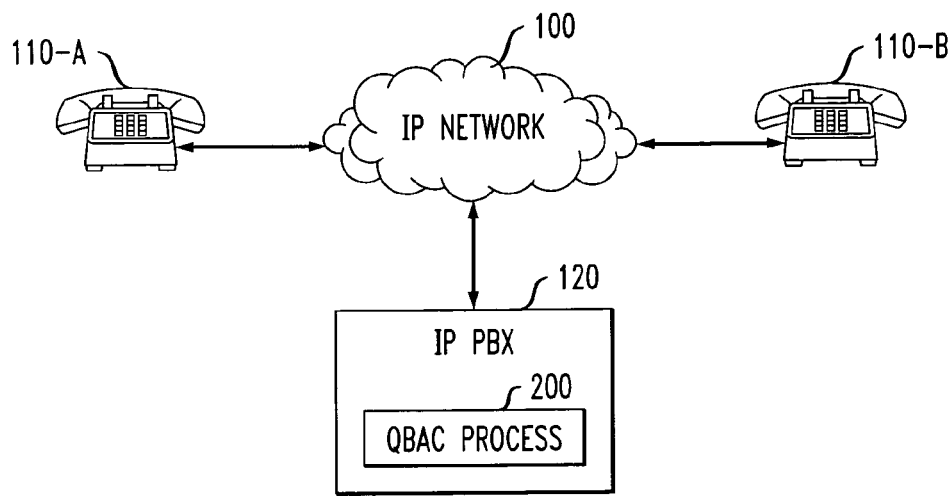
FIG. 1 illustrates a network environment in which the present invention can operate.
Figure 2:
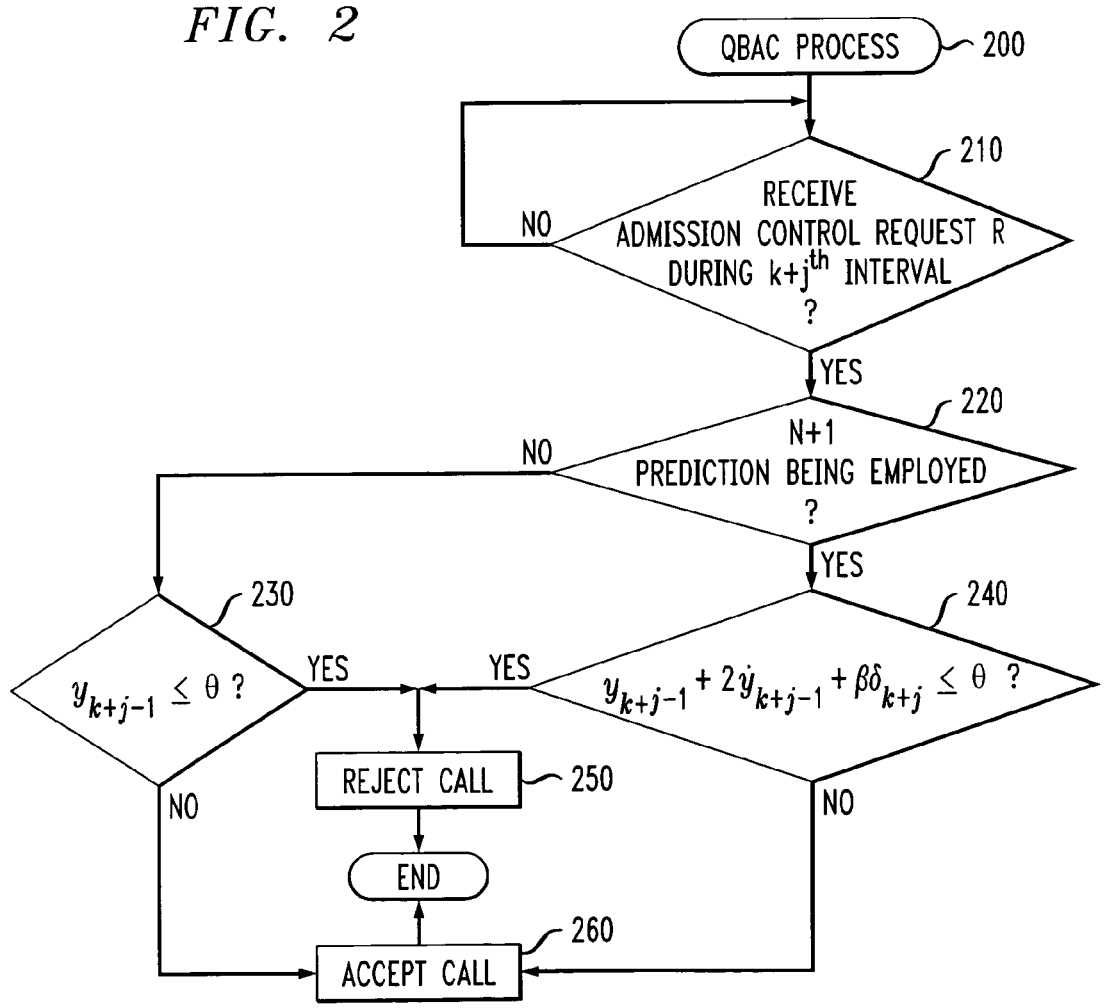
FIG. 2 is a flow chart describing an exemplary admission control process incorporating features of the present invention.

FIG. 1 is a block diagram of a network environment in which the present invention can operate. As shown in FIG. 1, two or more endpoints, such as endpoints 110-A and 110-B, attempt to establish a session, such as a VoIP session, over an IP network 100. A QBAC process 200, discussed further below in conjunction with FIG. 2, provides an admission control function in accordance with the present invention that uses QoS parameter measurements. In the exemplary enterprise implementation shown in FIG. 1, the QBAC process 200 resides on an IP private branch exchange (PBX) 120, such as the Avaya Communications Manager™, commercially available from Avaya, Inc. of Basking Ridge, N.J. In further variations, the QBAC process 200 can be implemented as a network service and reside on any node or host in the network 100, as would be apparent to a person of ordinary skill in the art. The network service would serve clients, such as an IP PBX 120. It is noted that the network 100 may be embodied as any combination of public or private, wired or wireless networks, as would be apparent to a person of ordinary skill in the art.

MBAC Admission Control

Consider a call admission control request for a call that will traverse some path in the network 100. For each request, the MBAC system must decide whether to admit or reject the call. Because the future is not known, the admission decision will predict the future path performance using the path's historical performance data. This historical data may be of many types, but for illustration purposes, the historical performance data is assumed to consist of an estimated "Mean Opinion Score", or "MOS", such as may be computed using the E-model described in "The E-model, a Computational Model for Use in Transmission Planning," ITU-T Recommendation G.107, March 2003, or other similar MOS-like scores.

Conventional MOS scoring algorithms were intended to be used for estimating the quality of VoIP calls. For admission control across a path in a network, the perspective is taken that a MOS or MOS-like score rates the performance of the path, i.e., the path's ability to transport an application session while meeting the application's QoS requirements; hereinafter, such a score is referred to as the "pathMOS." To incorporate other applications or environments for which such a path-MOS score is not a good measure of application performance, the proposed MBAC algorithm is readily adapted to other applications by simply using an appropriate path QoS/performance scoring algorithm, as would be apparent to a person of ordinary skill in the art.

Generally, an MBAC decision algorithm admits a call if a good call experience is predicted. The challenge is to accurately predict whether or not the call seeking admission will have a good or bad call experience, based, for example, on one or more predefined criteria or thresholds.

A threshold value $\theta$ can be defined for the pathMOS score, as follows: If pathMOS exceeds $\theta$, then calls on the path receive acceptable QoS and the experience will be "good;" otherwise, calls receive unacceptable QoS and the experience will be "bad." Hence, in this exemplary model, the MBAC algorithm will admit a call if the algorithm predicts that pathMOS will be greater than or equal to $\theta$ during the lifetime of the call, the duration of which is called the call holding time. Otherwise, the admission is rejected. It is noted that the pathMOS score can be measured for a subset of all possible paths between endpoints 110, i.e., because it is possible to select one path from among a subset of possible paths between a pair of endpoints, it may be desirable to compute pathMOS for all paths in the subset and select the one with the best pathMOS score for transporting session data. If a path-MOS score is not available for a desired path, the admission control request can be processed in a conventional manner (or a measurement can be performed as part of the admission control request, e.g., on-demand measurement).

QBAC Solution for the N+1 Problem

In an exemplary embodiment of the present invention, the QBAC process 200 supplements a primary counting-based admission control (CBAC) system. Generally, the primary role of a CBAC technique is to prevent the number of calls traversing a link from exceeding some preconfigured value N. Equivalently, CBAC prevents the application traffic load from exceeding some average bandwidth limit, B. Thus, the CBAC process ensures that N+1 calls are not admitted across a link, often referred to as the "N+1" problem. For an MBAC system, the analogous behavior is to admit or reject a new call if the additional load will cause the QoS supported by the path to degrade below an acceptable/threshold level. Because of various attributes of typical packet-switched networks, typical performance behavior is for QoS to be well within requirements up to N calls, with the N+1$^{st}$ call causing a sharp degradation in QoS for all calls traversing the bottleneck link in the path. Hence, an accurate prediction of the impact on QoS resulting from the additional load of the next call is a valuable component of an admission control system.

Without loss of generality, and for ease of illustration, it is assumed that the pathMOS score is updated uniformly in time, i.e., at each time unit (e.g., five seconds), the pathMOS score is updated using raw measurement data. In one exemplary implementation, a performance measurement subsystem is employed that uses an on-demand testing mode. The on-demand mode does not produce pathMOS scores uniformly in time, so the N+1 solution described herein may need to be modified to work in an on-demand environment, such modifications being clear to those skilled in the art.

For QBAC, time is slotted into intervals of uniform length $t_u$, with interval $t_k$ being the interval $[kt_u, (k+1)t_u)$ for k equal to 0, 1, . . . . Let $y_k$ represent the pathMOS score computed for interval $t_k$, in which case the test data is a sequence $y_i$, i=0, 1, . . . of pathMOS scores (also referred to as the pathMOS process associated with the test flow path). For simplicity, assume that the time interval $t_u$ is unity.

It is noted that an exponentially-weighted averaging scheme can be used to estimate $y_k$, the $k^{th}$ element of $y_i$, as follows: suppose the pathMOS score computed over the $k^{th}$ time interval is some value $h_k$, then $y_k$ is estimated as:

$$y_k = \alpha h_k + (1-\alpha) y_{k-1} \quad (5)$$

where $\alpha \in [0,1]$. $\alpha$ parameterizes the weight given to the most recent sample versus the weight given to historical data. Values of $\alpha$ close to zero have a smoothing effect on sudden variations in the $h_k$ measures. In S. Tao et al., "Improving VoIP Quality Through Path Switching," to appear in IEEE INFOCOM 2005, and downloadable from www.seas.upenn.edu/~shutao/paper/infocom05.pdf, for example, $\alpha$ is set to 0.2, which was empirically chosen in a path-optimization context because it gives good responsiveness without risking oscillatory behavior. In TCP implementations, exponential averaging is used to estimate round-trip time (RTT), and an $\alpha$ value of 0.1 is recommended. See, e.g., W. R. Stevens, TCP/IP Illustrated, Volume 1, Addison-Wesley, Boston, Mass. (1994).

Equation (5) can be used in the present algorithms for its dampening effect, especially as the method proposed below uses derivatives of the $y_i$ process to predict future behavior. Regardless, the use of exponential averaging and the value of $\alpha$ do not have any affect on the derivation of the proposed N+1 solution.

Finite difference methods and numerical methods are used herein for ordinary differential equations to analyze the sequence $y_i$. See, e.g., G. H. Golub and J. M. Ortega, Scientific Computing and Differential Equations, Academic Press, New York, N.Y. (1991).

After $y_k$ has been computed for the $k^{th}$ interval, to first order $y_{k+1}$ is approximated as $$\hat{y}_{k+1} = y_k + \dot{Y}_k \quad (6)$$

where the derivative $\dot{y}_k$ is approximated as $$\dot{y}_k = \frac{1}{2}[(y_k - y_{k-1}) + (y_{k-1} - y_{k-2})] = \frac{y_k - y_{k-2}}{2}. \quad (7)$$

Initially, assume that until time interval k, the sequence $y_i$ represents the pathMOS process of the test path only, i.e., no calls have been admitted.

Now consider a new flow (call) that enters the system during interval k. Assume that because additional load has been added to the system without increasing capacity, the addition of this flow will affect the pathMOS process $y_i$. Also, for simplicity, assume that the effect on the pathMOS process of the new flow is measured during interval k+1 as $y_{k+1}$ (and not in interval k).

Identify the additional load added to the system during time interval k with $\delta_k$, possibly computed as the product of the average packet rate and average packet size of the new calls. Now further approximate $\dot{y}_k$ as $$\dot{y}_k = \dot{y}_{k-1} + \beta\delta_k, \quad (8)$$

for some value β. Note that Equation (8) makes a simplifying assumption that all of the change in the $y_i$ process between intervals k+1 and k is sourced by $\beta\delta_k$. If in practice this turns out to be an inaccurate assumption, then one method to improve accuracy is to modify Equation (8) to:

$$\dot{y}_k = \dot{y}_{k-1} + \ddot{y}_{k-1} + \beta\delta_k. \quad (9)$$

For simplicity, however, Equation (8) is used for the remainder of the QBAC model description.

Substitution of Equation (8) in Equation (6) (and ignoring approximations) gives $$\beta = \frac{y_{k+1} - y_k - \dot{y}_{k-1}}{\delta_k}, \quad (10)$$

as the solution for β. In the present context, β estimates the impact on the pathMOS process of the new flow load $\delta_k$. Consider, though, that the value of β computed after the admission of this first call can be used to predict the impact of future call admissions on the pathMOS process, and therefore be used to solve the N+1 problem in an admission control decision process, as follows.

Suppose now during interval k+j that another flow will enter the system. At entry time, the value $y_{k+j}$ is not available, but $y_{k+j+1}$ can either be predicted by using values computed over the k+j−1$^{th}$ interval or by waiting until the k+j$^{th}$ interval completes and then using values computed over that interval. For the former case, $y_{k+j}$ is first estimated as $y_{k+j-1} + \dot{y}_{k+j-1}$ and then a prediction $\hat{y}_{k+j+1}$ of $y_{k+j+1}$ is computed as:

$$\hat{y}_{k+j+1} = y_{k+j-1} + 2\dot{y}_{k+j-1} + \beta\delta_{k+j}, \quad (11)$$

in accordance with Equations 6 and 8. Similar to Equation 9, an estimate of a second order term $\ddot{y}_{k+j-1}$ may be included in Equation 11, if deemed necessary. Since the future performance is being predicted in interval k+j+1 from actual performance data in interval k+j−1, using the $\ddot{y}_{k+j-1}$ may be appropriate because of the two-interval lag.

According to one aspect of the invention, the QBAC measure employed by equation (11) is based on an end-to-end path performance measure, $y_{k+j-1}$, for the interval k+j−1. In addition, the QBAC measure employed by equation (11) is based on the current QoS, and not just bandwidth and load considerations. Finally, the QBAC measure employed by equation (11) is computationally efficient, in terms of the required hardware, software and time. Generally, upon receipt of an admission control request at time k+j, given the end-to-end path measure, $y_{k+j-1}$, for the interval k+j−1, equation (11) evaluates the trajectory of the path performance measurement process $y_i$ to predict the end-to-end path measure, $y_{k+j+1}$, for the interval k+j+1, if the call were to be admitted, assuming $\delta_k$ is the estimated load of the call requesting admission. The path performance measurement process $y_i$ records the QoS history for the selected path between the endpoints 110. Generally, a first derivative of the path measure process for interval k+j−1 provides the slope of the underlying function during that time interval, and an indication of the function trajectory.

In the latter case of using data from interval k+j, the prediction $\hat{y}_{k+j+1}$ is computed as $$\hat{y}_{k+j+1} = y_{k+j} + \dot{y}_{k+j-1} + \beta\delta_{k+j}. \quad (12)$$

This approach will add to post-dial delay, which may be unacceptable in some environments. In either case, the value, β, which measured the impact of the admission of the load, $\delta_k$, of the first call is used to predict the impact on the process for a future call load $\delta_{k+j}$. The admission control process then uses the prediction $(\hat{y})_{k+j+1}$ in a decision process, possibly by comparing $(\hat{y})_{k+j+1}$ with a threshold value θ. If the call is admitted, then β should be updated using Equation 10 but with actual measured values $y_{k+j+1}$, $y_{k+j}$, $\dot{y}_{k+j-1}$ and $\delta_{k+j}$. β can then be used to predict the impact on pathMOS of the next flow that may enter the system. As discussed hereinafter, however, a more accurate prediction method may be to estimate a β value based on historical information rather than to estimate a β value based solely on Equation 10.

A flow's packet delay and loss values, which are probably highly correlated with pathMOS, relate directly to queue sizes in the switching elements along a path. Queue sizes change non-linearly with changes in bandwidth load, especially as the system load approaches capacity. Thus, a given call load $\delta_k$ will impact pathMOS measures differently depending on the state of the pathMOS process, i.e., the value β may differ for different values of $y_k$, $\dot{y}_k$, and possibly to a lesser extent, $\delta_k$. In Equation 11, a value β, which was computed at time k, is used to predict QoS impact during interval k+j. It could be the case that the j is large enough such that the pair of values $y_{k+j-1}$, $\dot{y}_{k+j-1}$ differ significantly from $y_k$, $\dot{y}_k$, and therefore the β value computed from interval k data may not afford an accurate prediction during interval k+j, i.e., β is stale. Also, due to the high degree of non-linearity of queue sizes as load approaches capacity, use of second derivatives (or higher derivatives) may need to be included in the model.

A possible solution to this problem is to treat the computed β values as samples of some unknown function $f(y_k, \dot{y}_k, \delta_k)$. Over time, enough samples of $f(\cdot)$ will be collected such that reliable estimates $\hat{f}(\cdot)$ of $f(\cdot)$ can be computed for arbitrary values of $y_k$, $\dot{y}_k$, $\delta_k$. Then the estimate $\hat{f}(y_{k+j}, \dot{y}_{k+j}, \delta_k)$ may be used in place of β in Equation 11. A simple estimator is to use a β value that is an average of all of the previously computed β values. Alternatively, an exponentially weighted averaging scheme may be appropriate, similar to that of Eq. (5).

Call Departures

As described herein, the QBAC description addresses new call arrivals but does not directly account for call departures. Call departures are indirectly accounted for in the $y_k$ values and do not need to be incorporated in the load parameter $\delta_k$ used in the equations above, except for when arrivals and departures occur in the same interval. There are two approaches to handling this case. One approach is to have applications signal call departures and then adjust the load values $\delta_k$ accordingly. There is still uncertainty in this approach as, for example, a prediction estimate for a call admission request may occur before a call departure in the same interval. It may be the case that the increase in prediction accuracy from directly accounting for departures does not justify the additional logic complexity.

A second approach ignores departures. As noted above, this only matters when arrivals and departures occur in the same interval, so the inaccuracies that may result from ignoring departures can be quantified as a function of the probability that such an event occurs. If the interval size $t_u$ is small relative to the call arrival and departure rate, then the event probability is small and can be safely ignored in the prediction computations. For example, suppose the bottleneck link in the path is a T1 link, which has a maximum capacity N of approximately 15 G.711-encoded calls. If the average call holding time $T_h$ is 5 minutes, then at peak load, the average call arrival and departure rate is $N/T_h=1$ call every 20 seconds. If $t_u$ is 5 seconds, and assuming random call arrival and departure processes, then the event probability that at least one departure and at least one arrival occur in the same interval is lower-bounded by 1/16. It is submitted that the upper bound of the event probability is less than 10%.

MBAC Request Handling Algorithm

FIG. 2 is a flow chart describing an exemplary QBAC process 200 incorporating features of the present invention. As shown in FIG. 2, the QBAC process 200 is initiated during step 210 when an admission control request R arrives during the $k+j^{th}$ interval. A test is performed during step 220 to determine if N+1 prediction is being used, in accordance with the present invention. If it is determined during step 220 that N+1 prediction is not being used, then the admission control request R is processed in a conventional manner during step 230. In particular, the following algorithm can be applied during step 230 if N+1 prediction is not being used:

Boolean Handle_Request(R):: return $(y_{k+j-1} \geq \theta)$.

If, however, it is determined during step 220 that that N+1 prediction is being used, then program control proceeds to step 240 for processing in accordance with the present invention. Generally, when an admission control request is received during the $k+j^{th}$ interval, what is known is the path-MOS score, $y_{k+j-1}$, for the previous interval $k+j-1$. The following processing steps determine the effect of admitting the call during the interval $k+j+1$.

If N+1 prediction is being used, then a test is performed during step 240 (based on equation (11)) to determine if $y_{k+j-1}+2\dot{y}_{k+j-1}+\beta\delta_{k+j}$ is less than or equal to the threshold, $\theta$. It is noted that the second term is obtained by evaluating equation (8) or (9), $\beta$ is obtained by evaluating equation (10) (or using an estimate based on historical data) and $\delta_k$ is the estimated load of the call requesting admission.

If it is determined during step 230 or 240 that the path metric does not exceed the defined threshold $\theta$, then the call is rejected during step 250. If, however, it is determined during step 230 or 240 that the path metric exceeds the defined threshold $\theta$, then the call is accepted during step 260.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method comprising:
receiving at a private branch exchange:
(i) performance data for a path, and
(ii) a request to transmit a call; and
establishing the call from the private branch exchange on the path when and only when a predicted performance of the call on the path is above a threshold,
wherein the predicted performance of the call on the path is based on the expression:

$$y_{k+j-1}+2\dot{y}_{k+j-1}+\beta\delta_{k+j}$$

wherein k and j are time intervals,
wherein $y_{k+j-1}$ is a mean opinion score for time interval $k+j-1$,
wherein $\delta_{k+j}$ is the estimated load of the call, and
wherein $\beta$ is the impact of the admission of the load of $\delta_k$.

2. The method of claim 1, wherein the path is on an Internet Protocol network.

3. The method of claim 1, wherein the performance data is historical performance data.

4. The method of claim 1, wherein the performance data is based on at least one quality of service metric.

5. The method of claim 1, wherein the performance data is measured performance data.

6. The method of claim 1, wherein the expression, $y_{k+j-1}$, is a path performance measure for the interval $k+j-1$.

7. The method of claim 1, wherein the expression, $y_{k+j-1}$ is obtained using an exponentially-weighted averaging scheme.

8. The method of claim 1, wherein the expression, $\dot{y}_{k+j-1}$, evaluates a trajectory of the path measure function $y_{k+j-1}$, to predict an end-to-end path measure, $y_{k+j-1}$, for the interval $k+j+1$, if the call is established.

9. A system comprising:
a memory; and
at least one processor, coupled to the memory, operative to:
receive:
(i) performance data for a path, and
(ii) a request to transmit a call; and
establish the call on the path when and only when a predicted performance of the call on the path is above a threshold,
wherein the predicted performance of the call on the path is based on the expression:

$$y_{k+j-1}+2\dot{y}_{k+j-1}+\beta\delta_{k+j}$$

wherein k and j are time intervals,
wherein $y_{k+j-1}$ is a mean opinion score for time interval k+j−1,
wherein $\delta_{k+j}$ is the estimated load of the call, and
wherein β is the impact of the admission of the load of $\delta_k$.

10. The system of claim 9, wherein the packet network is an Internet Protocol network.

11. The system of claim 9, wherein the performance data is historical performance data.

12. The system of claim 9, wherein the performance data is based on at least one quality of service metric.

13. The system of claim 9, wherein the performance data is measured performance data.

14. The system of claim 9, wherein the expression, $y_{k+j-1}$, is an end-to-end path performance measure for the interval k+j−1.

15. The system of claim 9, wherein the expression, $\dot{y}_{k+j-1}$, evaluates a trajectory of the path measure function $y_{k+j-1}$ to predict an end-to-end path measure, $y_{k+j-1}$, for the interval k+j+1, if the call is admitted.

16. An article of manufacture comprising a computer readable medium containing a program that when executed implements the steps of:
receiving:
(i) performance data for a path, and
(ii) a request to transmit a call; and
establishing the call from the private branch exchange on the path when and only when a predicted performance of the call on the path is above a threshold,
wherein the predicted performance of the call on the path is based on the expression:

$$y_{k+j-1}+2\dot{y}_{k+j-1}+\beta\delta_{k+j}$$

wherein k and j are time intervals,
wherein $y_{k+j-1}$ is a mean opinion score for time interval k+j−1,
wherein $\delta_{k+j}$ is the estimated load of the call, and
wherein β is the impact of the admission of the load of $\delta_k$.

* * * * *